United States Patent [19]

Okuwaki et al.

[11] Patent Number: 5,393,272
[45] Date of Patent: Feb. 28, 1995

[54] CHAIN BELT WHEREIN LINK PLATES HOLDING LOAD BLOCK MEMBER ARE SHAPED TO AVOID CONTACT WITH ADJACENT LOAD BLOCK MEMBERS

[75] Inventors: Shigeru Okuwaki, Shizuoka; Yukio Tomimura, Mie, both of Japan

[73] Assignees: Borg-Warner Automotive, Inc., Sterling Heights, Mich.; Toyota Jidosha Kabushiki Kaisha, Aichi, Japan

[21] Appl. No.: 225,189

[22] Filed: Apr. 8, 1994

[30] Foreign Application Priority Data

Apr. 9, 1993 [JP] Japan .................................. 5-107516

[51] Int. Cl.⁶ ............................................. F16G 13/00
[52] U.S. Cl. .................................................... 474/213
[58] Field of Search ................. 474/206, 212–217, 474/240, 242

[56] References Cited

U.S. PATENT DOCUMENTS

| | | |
|---|---|---|
| 4,776,829 | 10/1988 | Yamamuro et al. . |
| 4,938,737 | 7/1990 | Yamamuro . |
| 4,993,999 | 2/1991 | Mott . |
| 5,026,332 | 6/1991 | Mott et al. . |
| 5,061,226 | 10/1991 | Mott . |
| 5,090,948 | 2/1992 | Orth . |
| 5,131,892 | 7/1992 | Mott . |
| 5,147,251 | 9/1992 | Cole, Jr. .................... 474/212 X |
| 5,167,587 | 12/1992 | Mott . |
| 5,215,505 | 6/1993 | Sugimoto et al. . |
| 5,263,903 | 11/1993 | Mott ....................... 474/213 |

FOREIGN PATENT DOCUMENTS

| | | |
|---|---|---|
| 61-17744 | 1/1986 | Japan . |
| 63-72941 | 4/1988 | Japan . |
| 1-169145 | 7/1989 | Japan . |
| 1-169146 | 7/1989 | Japan . |
| 1-115043 | 8/1989 | Japan . |
| 1-203733 | 8/1989 | Japan . |
| 1-136747 | 9/1989 | Japan . |
| 1-316544 | 12/1989 | Japan . |
| 2-62445 | 3/1990 | Japan . |
| 2-118230 | 5/1990 | Japan . |

*Primary Examiner*—Michael Powell Buiz
*Attorney, Agent, or Firm*—Willian Brinks Hofer

[57] ABSTRACT

A power transmission chain belt wherein each of two mutually offset parallel chains includes connected sets of parallel links, and each chain is associated at its inner side with spaced-apart parallel load block members. Each set of parallel links includes link plates each having gripping protrusions on its inner-side end face which includes a concave part which is located between the protrusions and which engages an outer-side end face of the load block member. The inner-side end face of each link plate has surface regions which are spaced or offset from the concave part, in a direction from the inner side toward the outer side of the chain belt.

11 Claims, 9 Drawing Sheets

CHAIN BELT WHEREIN LINK PLATES HOLDING LOAD BLOCK MEMBER ARE SHAPED TO AVOID CONTACT WITH ADJACENT LOAD BLOCK MEMBERS

BACKGROUND OF THE INVENTION

1. Field of the Art

This invention relates to power transmission chains and, more particularly, to chains and chain belts used with continuously variable transmissions or variable-pulley transmissions.

2. Discussion of the Related Art

Chains or chain belts are conventionally utilized in power transmission applications, such as the transmission of power in automotive transmissions, engine timing applications, or industrial power transmission applications. Such chain belts are also utilized in vehicle transmissions of the type known as variable-pulley or continuously variable transmissions (CVTs). A CVT typically includes a pair of pulleys of variable or adjustable effective diameter that are placed on a pair of spaced shafts. An endless chain or loop connects the pulleys to transmit power between the shafts.

One type of an endless chain belt placed across variable diameter pulleys for power transmission is one which has a first chain and a second chain, or a pair of chain portions, with a plurality of interleaved, long-plate shaped link plates connected by pins. The two chains are interconnected in a parallel, but longitudinally offset or phased relationship. Parallel load block members, also known as struts or belt blocks, are placed at a predetermined interval or spacing along the length of the first and second chains for the transmission of load or power, such that each belt block extends in the direction parallel to the direction of width of the first and second chains. The belt blocks are pinch-pressed between the opposed surfaces of the V-shaped groove of each variable pulley and are associated alternately with the first and second chains. An example of such a phased power transmission chain belt for a CVT is described in Publication JP-A-2-118230 (published in 1990) of unexamined Japanese Patent Application.

Figure 13:
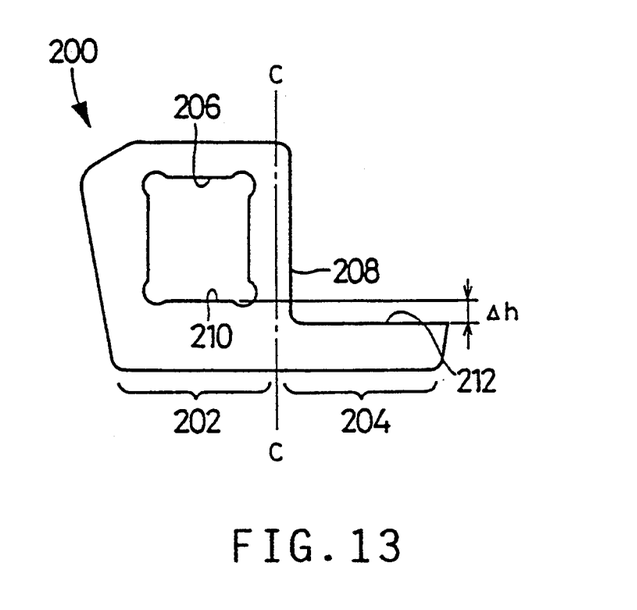
FIG. 13 is a front view of the belt block of a chain belt of the prior art.

An example of a belt block or load block member of the prior art is indicated at 200 in FIG. 13. The load block 200 used in the above-described conventional chain belt includes a first part 202 and a second part 204, which are located on opposite sides of transverse centerline C. A rectangular through-hole 206 is formed in the first part 202 in a rectangular frame form. The second part 204 has a cut-out 208 at its upper portion, and a bottom portion which consists of an extension from the bottom portion of the rectangular frame of the first part 202.

Either the first chain or second chain is inserted through the through-hole 206 of the first part 202 such that this chain is not movable relative to the load block, and the other of the first and second chains is received by the cut-out 208 of the second part 204. A certain predetermined distance Δh is provided between inner wall surface 210 of the through-hole 206 and top surface 212 of the second part 204 in the radial direction of the variable V-pulley, which is the vertical direction as seen in FIG. 13. The distance Δh is provided so that contact is prevented between the second part 204 and the inner peripheral surface or inner-side end face of the link plates that are received in the cut-out 208. Such contact would occur due to a relative up and down motion or radial motion of the first chain and second chain when the link plates come into engagement with the V-groove of the V-pulley or leave the V-groove.

However, in the load block 200 of the conventional chain belt, the rigidity of the rectangular frame of the first part 202 is much greater than the rigidity of the second part 204. Accordingly, stress is concentrated at the boundary between the first part 202 and second part 204 during power transmission between the V-pulleys, which limits the endurance strength of the load block 200 in some applications of the chain belt. Also, on account of the provision of the distance Δh, which prevents the contact of the link plates and the load block due to the relative radial motion of the first and second chains, the shape of the belt block 200 is complex and its manufacture is difficult.

SUMMARY OF THE INVENTION

It is therefore an object of the present invention to provide a chain belt which have load block members which provide improved endurance strength and which are easy to manufacture.

The above object may be achieved according to the principle of the present invention, which provides a power transmission chain belt engageable with pulleys each having a V-groove, comprising: (a) a first chain and a second chain which are arranged in side-by-side parallel relationship with each other, each of the first and second chains including a plurality of sets of parallel links, and pivot members for connecting the sets of parallel links, the first and second chains being offset from each other in a longitudinal direction thereof by a distance equal to a half of a pitch of the sets of parallel links, each set of parallel links of the first and second chains including a plurality of link plates each of which has an inner-side end face on an inner side of the first and second chains, each link plate having a pair of gripping protrusions formed so as to extend from an intermediate portion of the inner-side end face thereof, the inner-side end face including a concave part located between the gripping protrusions; and (b) a plurality of load block members each of which has an outer-side end face on an inner side of the first and second chains, the load block members being arranged in spaced-apart parallel relationship with each other and held alternately by the gripping protrusions of the link plates of the first and second chains, with the outer-side end faces of the load block members engaging the concave parts of the link plates, each load block member having a substantially constant height over an entire length thereof and being oriented such that the length of each load block member is parallel to a direction of width of the first and second chains, and wherein the inner-side end face of each link plate has surface regions which are spaced from the concave part in a direction opposite to a direction of extension of the gripping protrusions, whereby the surface regions of each of the link plates of one of the first and second chains which link plates are held by one of the load block members are spaced apart from the outer-side end face of the other load block members which are held by the link plates of the other of the first and second chains and which are located adjacent to the above indicated one load block member.

In the power transmission belt of the present invention constructed as described above, the sets of parallel links including link plates each having a pair of gripping protrusions are connected to each other by the pivot members, to provide the first and second chains. The gripping protrusions are formed so as to extend from an intermediate portion of an inner-side end face on the inner side of the chain belt. The first and second chains are associated at their inner side with a plurality of load block members which are arranged in spaced-apart parallel relationship with each other. The load block members are held alternately by the gripping protrusions of the link plates of the first and second chains. Each load block member has a substantially constant height over its entire length and is oriented such that the direction of its length is parallel to the direction of width of the first and second chains. With the belt block members thus held by the link plates of the first and second chains, power transmission is effected between the load block members and the first and second chains. Since the height of each belt block member is substantially constant over its entire length, the belt block member is effectively protected against local stress concentration during operation of the chain belt for power transmission, which would occur on the known chain belt. Further, the constant height arrangement leads to a significant increase in the endurance strength of the belt block members.

The present chain belt is further characterized in that the surface regions of the inner-side end face of each link plate are spaced or offset a predetermined distance from the concave part also formed on the inner-side end face, in the direction opposite to the direction of extension of the gripping protrusions. According to this arrangement, the surface regions of the link plates of one of the first and second chains which link plates are held by one of the load block members are spaced apart from the outer-side end face of the other load block members which are held by the link plates of the other of the first and second chains and which are located adjacent to the above-indicated one load block member. For instance, the inner-side end face of the link plates of the first chain which are held by a certain load block member is spaced apart from the outer-side end face of the adjacent load block members held by the link plates of the second chain, in the direction from the inner side of the chain belt toward the outer side of the chain belt. The present arrangement is therefore effective to prevent undesirable contact between the link plates of one of the first and second chains with the load block members of the other of the first and second chains, which contact would take place due to a relative movement of the first and second chain in the radial direction of the pulleys. Accordingly, the present chain belt does not require each load block member to have a cut-out portion to provide a clearance or gap $\Delta h$ as indicated in FIG. 13. In other words, the load block member has a substantially constant height over its entire length which is parallel to the direction of width of the chain belt. The constant height structure provides increased strength of the load block members, and permits easier manufacture of the load block members owing to the simplified configuration.

The surface regions of the inner-side end face of the link plate may consist of a pair of regions located on opposite sides of the pair of gripping protrusions, namely, on opposite sides of the concave part located between the gripping protrusions.

The outer-side end face of the each load block member may be formed to have an arcuate shape in cross section. In this instance, the concave part of the link plate is formed to have a shape in cross section substantially identical with the arcuate shape of the outer-side end face of the load block member.

Generally, one of the adjacent two sets of parallel links further includes two stopper plates which are disposed so as to sandwich the plurality of link plates.

The load block members engaging each of the first and second chains may consist of a plurality of first load block members and a plurality of second load block members, which are arranged alternately in the longitudinal direction of the first and second chains. In this case, each of the first and second load block members has a pair of engaging grooves, so that the gripping protrusions of the link plates of one of the first and second chains engage the engaging grooves of one of the first and second load block members which are adjacent to each other, while the gripping protrusions of the link plates of the other of the first and second chains engage the engaging grooves of the other of the adjacent first and second load block members which are adjacent to each other. The engaging grooves of the first and second load block members may have different length values.

Each of the link plates may have a pair of pin-fitting apertures which are spaced apart from each other in a direction along a length thereof parallel to the longitudinal direction of the first and second chains, so that the pivot members extend through the pin-fitting apertures of the link plates of adjacent sets of the plurality of sets of parallel links, whereby the adjacent sets are connected to each other by the pivot members.

Each of the pivot members consists of a first pin and a second pin which engage with each other. The first and second pins may be formed to have facing arcuate contacting surfaces one of which rocks on the other.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

One embodiment of this invention will be explained below in detail, by reference to the accompanying drawings.

Figure 2:
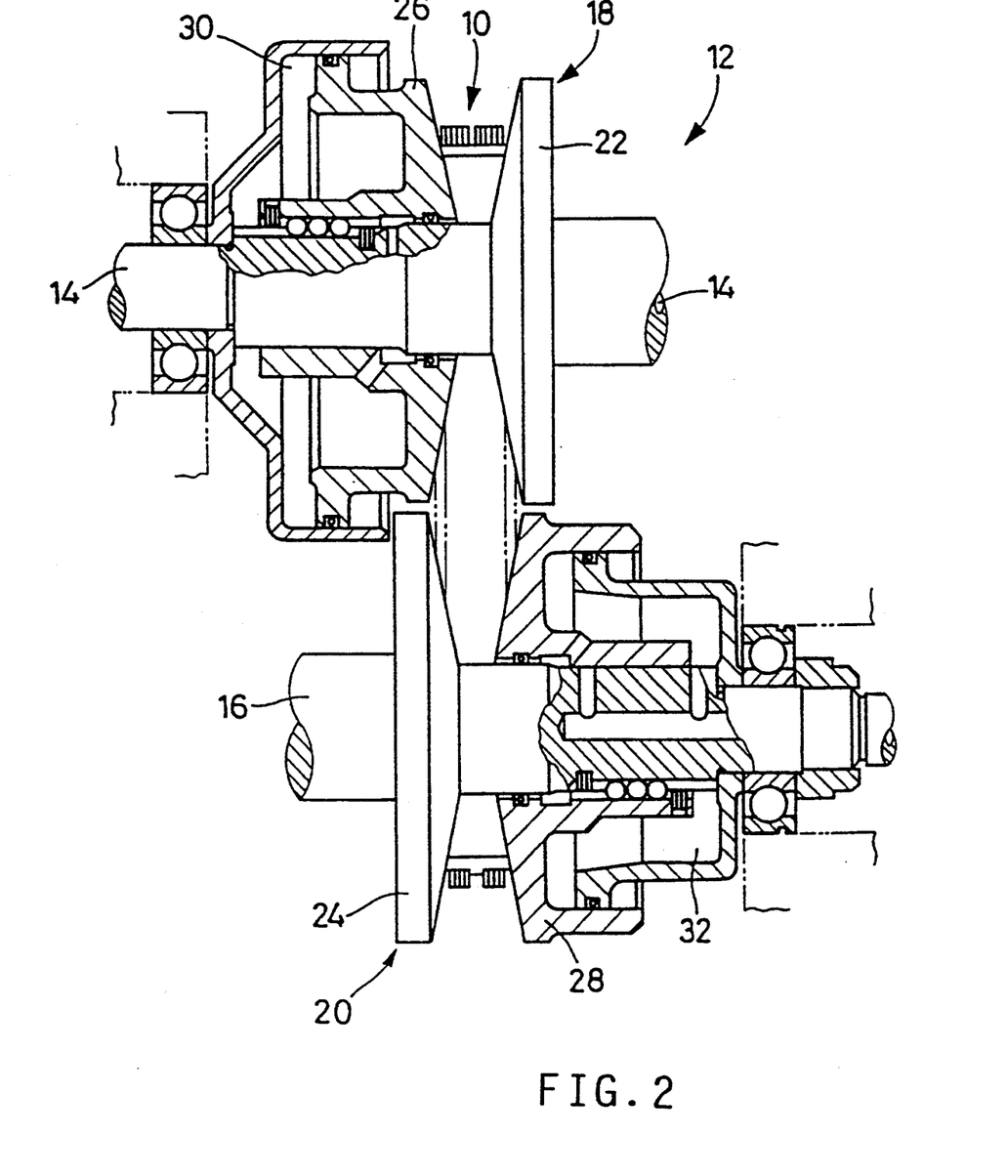
FIG. 2 is a schematic view illustrating the components of a continuously variable transmission having a chain belt constructed according to one embodiment of the present invention.

In the drawings, FIG. 2 shows a belt-and-pulley type stepless speed changer or continuously variable transmission (CVT) 12 for motor vehicles, equipped with a chain belt 10 which embodies the present invention. In FIG. 2, belt-and-pulley type stepless speed changer 12 has an input shaft 14 that is parallel to an output shaft 16. A pair of variable-diameter pulleys 18, 20 are provided on the respective input and output shafts 18, 20. The first pulley 18 is located on the primary side, that is, mounted on the input shaft 14, and the second pulley 20 is located on the secondary side, that is, mounted on the output shaft 16. The effective diameters of the pulleys 18, 20 are variable to allow adjustment of the speed ratio and the tension of the belt. The chain belt 10 is placed across these variable-diameter pulleys 18 and 20 for power transmission through the chain-belt 10.

The primary or input-side pulley 18 includes a primary fixed rotor 22, which is fixed to the input shaft 14, and a primary movable rotor 26, which is movable in the axial direction on the input shaft 14. Similarly, the secondary variable-diameter pulley 20 includes a secondary fixed rotor 24, which is fixed to the output shaft 16, and a secondary movable rotor 28, which is slidable on the output shaft 16. The fixed and movable rotors of each pulley 18, 20 form a V-groove for the chain belt 10. To the primary and secondary movable rotors 26 and 28, thrust forces of a primary hydraulic actuator 30 and a secondary hydraulic actuator 32 are applied, respectively, so that the speed ratio of the belt-and-pulley type stepless speed changer or CVT 12 is changed continuously with these thrust forces being regulated by suitable control valve means well known in the art.

Figure 1:
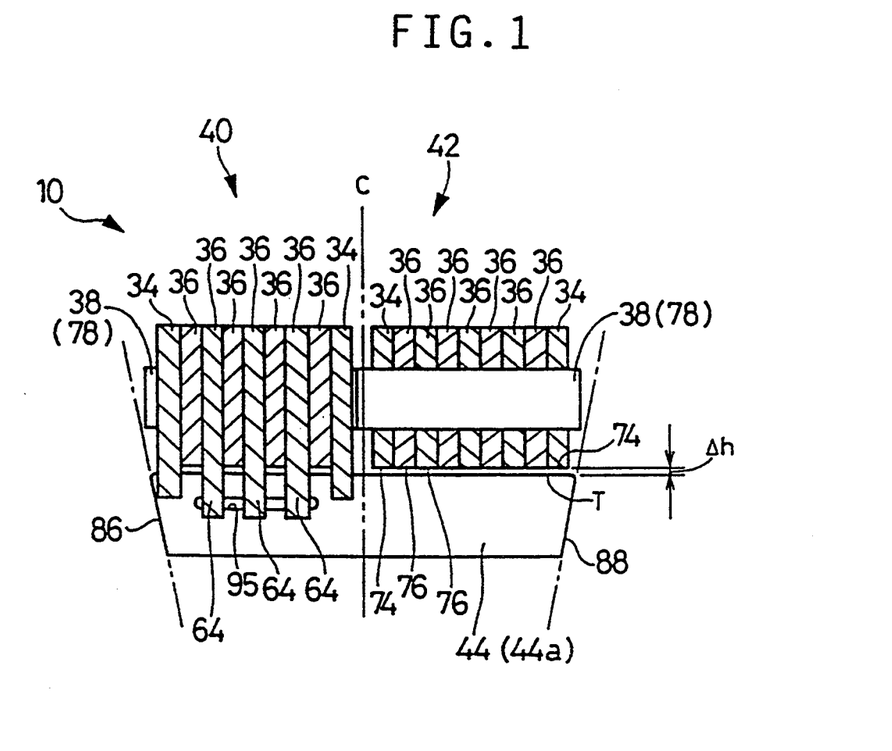
FIG. 1 is a sectional view taken along line 1—1 of FIG. 3.
Figure 3:
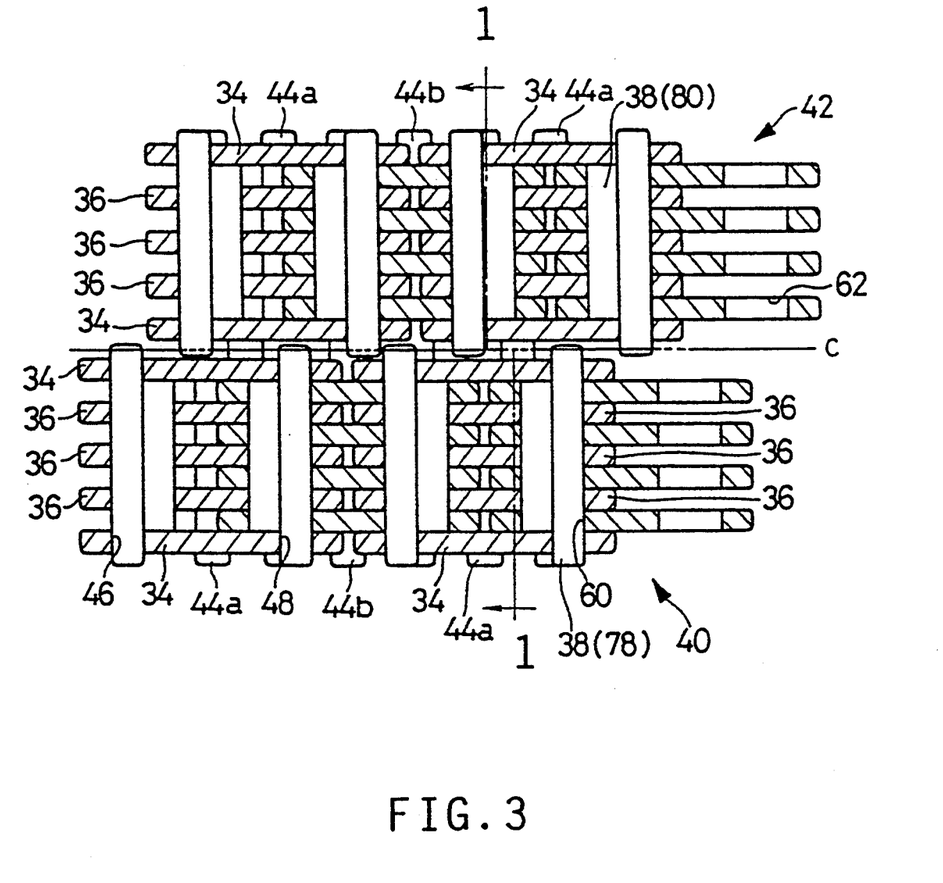
FIG. 3 is a sectional plan view of the chain-belt of FIG. 1 illustrating the links along a portion of first and second chains.

The chain-belt 10 comprises a first chain 40 and a second chain 42, which are parallel to each other, and which are offset longitudinally by approximately one-half pitch, as shown in FIGS. 1 and 3. The chains 40, 42 are formed of interleaved links that are placed in side-by-side relation. A set of links is formed by two parallel stopper plates 34 and three link plates 36 that are positioned between the stopper plates 34. Such a set is interleaved with an adjacent set of links which consists of four mutually parallel link plates 36. The sets of links are interleaved by the insertion of one end of each link plate between the stopper plates 34. The link plates 36 and stopper plates 34 are connected in the longitudinal direction by pivot members in the form of rocker pins 38 and thereby formed into a single endless chain unit 40, 42.

Figure 4:
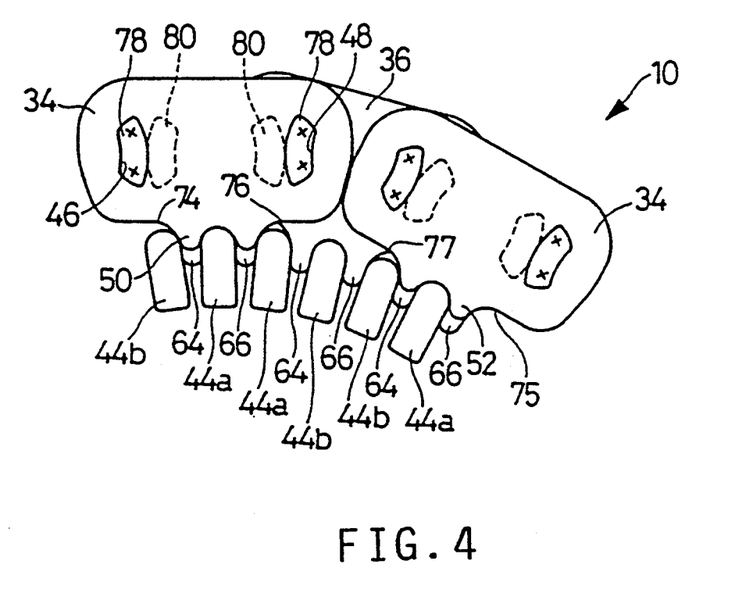
FIG. 4 is a side elevational view of one portion of the chain-belt shown in FIG. 1.

Load block members in the form of belt blocks 44 are attached alternately to the inner side of the first chain 40 and the second chain 4, while being spaced apart from each other at preset intervals and parallel with the transverse or width direction of the first and second chains 40 and 42. FIGS. 1 and 3 show the belt blocks 44 connected to the chains 40, 42 such that the belt blocks 44 extend along respective straight lines parallel to the direction of width of the chains, and FIG. 4 shows the belt blocks 44 connected to the chains 40, 42, which belt blocks 44 are arranged along an arc of the bottom wall of the V-groove of the pulley 18 or 20. Also, in the cross-sectional view of FIG. 1, the rocker pin 38 of the second chain 42 is shown in its entirety. One-dot chain line in FIG. 1 indicates the opposed inner wall surfaces of the V-groove of the pulley 18, 20, and two-dot chain line C in the same figure indicates the center line of the chain belt 10 consisting of the first and second chains 40, 42 and the belt blocks 44. The inner side of the chains 40, 42 is defined as the side nearer to the bottom wall of the V-groove of the pulley 18, 20.

Figure 5:
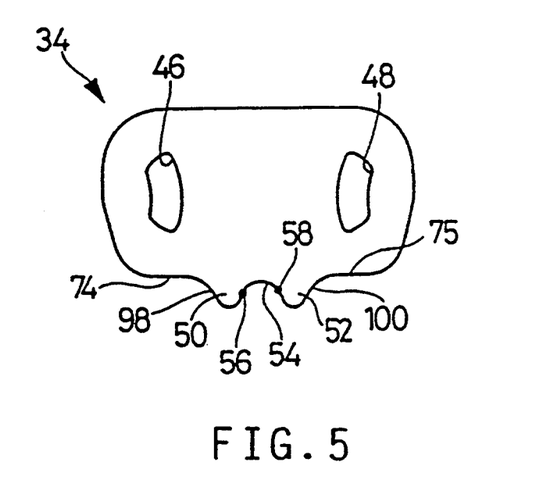
FIG. 5 is a side elevational view of a stopper plate used in the chain-belt of FIG. 1.

Each of the stopper plates 34 is a generally elongate rectangular plate as shown in FIG. 5. The stopper plate 34 has one pair of arc-shaped or arcuate pin-fitting apertures or holes 46 and 48 formed at the respective opposite end portions thereof and one pair of engaging protrusions 50 and 52 formed so as to extend from an inner peripheral side or inner-side end face thereof (i.e., on a lower end face as shown in FIG. 5 on the inner side nearer to the bottom of the V-groove of the pulley 18, 20). The protrusions 50, 52 extend with a preset mutual spacing therebetween and are positioned at a longitudinally intermediate portion of the stopper plate 34, between the pin-fitting holes 46 and 48. The protrusions 50, 52 extend in the direction from the outer side toward the inner side of the chain belt 10. The stopper plate 34 includes an engaging concave part 54 that receives the outer end of the belt block 44. The concave part 54 is formed between the pair of engaging protrusions 50 and 52 and is adapted to contact the outer edge or outer-side face of the belt block 44 at a pair of contact points 56 and 58, which are indicated by the black dots in FIG. 5.

Figure 6:
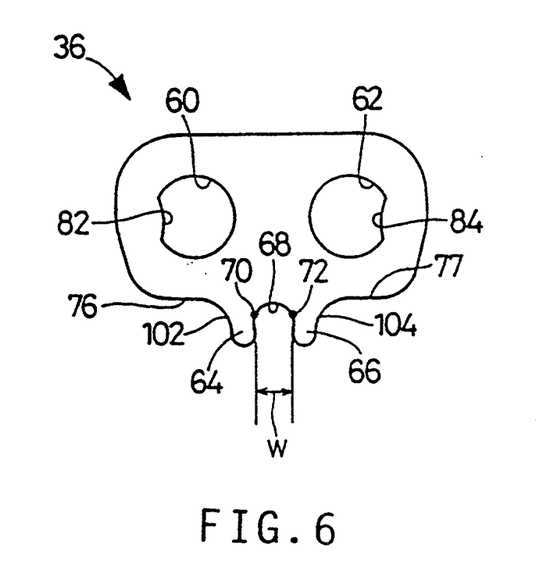
FIG. 6 is a side elevational view of a link plate used in the chain-belt of FIG. 1.

Each of the link plates 36, which is shown in FIG. 6 has nearly the same rectangular plate shape as the stopper plate 34. The link plate 36 has one pair of generally circular pin-fitting apertures or holes 60 and 62, which are formed at the opposite end portions. Each link plate 36 also includes a pair of gripping protrusions 64 and 66 that are formed with a preset mutual spacing W therebetween so as to extend from an inner peripheral side or inner-side end face thereof (i.e., formed on a lower end face nearer to the bottom of the V-groove of the pulley). These gripping protrusions 64, 66 are positioned at a longitudinally intermediate part of the link plate 36, between the pin-fitting holes 60 and 62. The protrusions 64, 66 extend in the direction from the outer side toward the inner side of the chain belt 10. The gripping protrusions 64 and 66 extend a further distance from the tips of the engaging protrusions 50 and 52 of the stopper plate 34 and are spaced apart from each other by a distance smaller than that of the protrusions 50, 52. Like the engaging protrusions 50 and 52, the gripping protrusions 64, 66 define therebetween an engaging concave part 68 that receives the outer-side end portion of the belt block 44, and has a pair of contact areas or contact points 70 and 72, which are indicated by the black dots in FIG. 6. The engaging concave part 68 is shaped for abutting contact with the outer edge or outer-side end face of the belt block 44.

As shown in FIGS. 5 and 6, the engaging concave parts 54 and 68 formed at the inner-side side end face of the stopper plate 34 and link plate 36 are located a certain distance on the inner side than surface regions 74 and 75, or 76 and 77, which are positioned on the side of the protrusions 50, 52 or 64, 66 which is remote from the engaging concave parts 54 or 68. In other words, the bottoms of the concave parts 54 and 68 are spaced a predetermined distance from the surface regions 74, 75, or 76, 77 in the direction of extension of the protrusions 50, 52, 64, 66. Therefore, when the chain belt 10 is assembled with the belt blocks 44 being arranged to extend parallel with each other in the direction of width of the chain belt 10 as shown in FIGS. 1, 3, 7(a) and 7(b), a gap or clearance Δh is left between the surface regions 74 and 75 or 76 and 77 of the stopper and link plates 34, 36 of one of the first and second chains 40, 42, and the outer-side end faces or outer edges T of the belt blocks 44. FIG. 1 shows the gap Δh formed between the surface regions 74, 76 of the stopper plates 34 and link plates 36 of the second chain 42 and the belt block 44.

The certain distance Δh of offset or spacing of the concave parts 54, 68 with respect to the surface regions 74, 75, 76, 77 is set so as to substantially prevent a contact between the stopper and link plates 34, 36 and the belt blocks 44, which would occur due to relative radial movements of the first and second chains 40, 42 in the radial direction of the pulley 18 or 20 when the plates 34, 36 come into engagement with the V-groove of the pulley 18 or 20 or leave the V-groove, during use of the chain belt 10 on the pulleys 18, 20. In the present embodiment, the distance of offset or gap Δh is set to approximately 0.3 mm when the pitch of the first and second chains 40, 42 is 8 mm and the engagement radius of the chain belt 10 is 30 mm.

The apertures or pin-fitting holes 60 and 62 of the link plate 36 have respective convex rotation stoppers 82 and 84 formed relatively adjacent to the respective longitudinally opposite ends of the link plate 36, as shown in FIG. 6. As shown in FIG. 7, the rocker pin 38 consists of a first arcuate pin 78 and a second arcuate pin 80, each of which has an arcuate cross sectional shape. Each rotation stopper 82, 84 is adapted to engage the arcuate surface of the second arcuate pin 80, to thereby prevent rotation of the arcuate pin 80 within the pin-fitting hole 60, 62 relative to the link plate 36. This arrangement causes the first arcuate pin 78 to roll on the second arcuate pin 80 during rotation of the belt 10 with the pulleys 18, 20.

Figure 8:
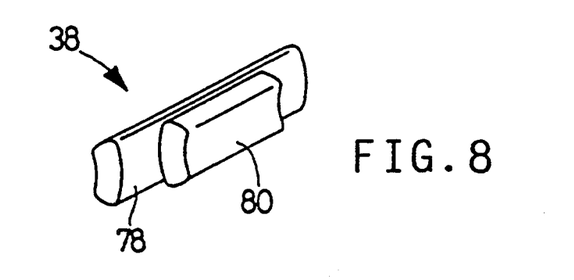
FIG. 8 is a perspective view of a rocker pin used in the chain-belt of FIG. 1.

The rocker pin 38 rotatably connects the stopper plates 34 and the link plates 36. As shown in FIG. 8, the pair of first arcuate pin 78 and second arcuate pin 80 have arcuate surfaces in rolling contact with each other. The length of the first arcuate pin 78 is larger by a predetermined amount than the total thickness of the two stopper plates 34 and the seven link plates 36. The length of the second arcuate pin 80 is nearly the same as the total thickness of the seven link plates 36. When the first and second chains 40, 42 are assembled, the first and second arcuate pins 78, 80 extend through the pin-fitting holes 60 and 62 of the seven link plates 36, while only the first arcuate pin 78 extend through the apertures 46, 48 of the two outer stopper plates 34, which are positioned so as to sandwich the inner seven inner link plates 36. The first and second arcuate pins 78 and 80 roll on each other at their mutually contacting surfaces as the sets of stopper and link plates 34, 36 are moved along the curvatures of the pulleys 18, 20 at the opposite ends of the loop of the chain belt 10 when the chain belt is rotated with the pulleys 18, 20.

Figure 9:
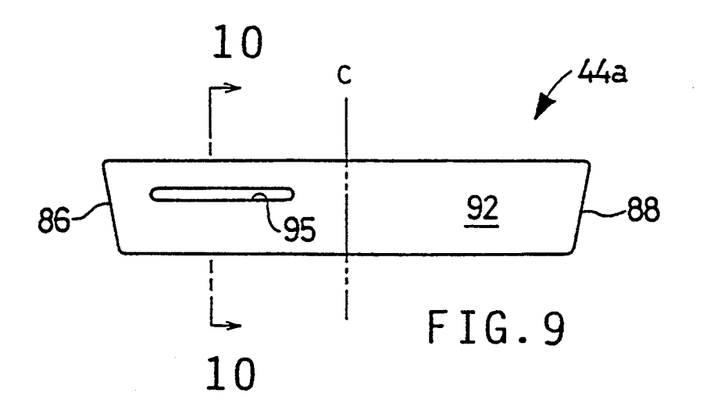
FIG. 9 is a front view of the first belt block shown in FIG. 1.
Figure 10:
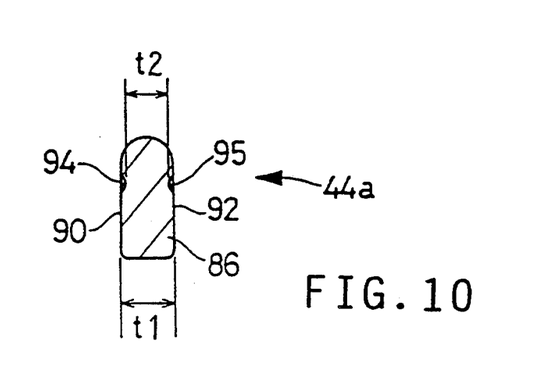
FIG. 10 is an elevational view of the first belt block taken along line 10—10 of FIG. 9.
Figure 11:
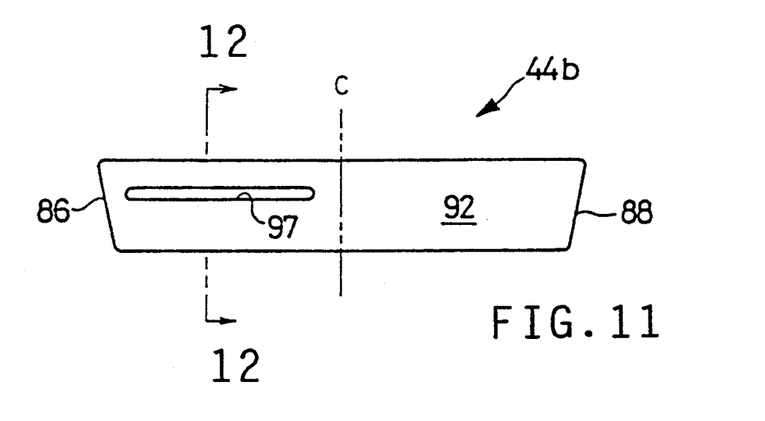
FIG. 11 is a front view of the second belt block shown in FIGS. 3 and 4.
Figure 12:
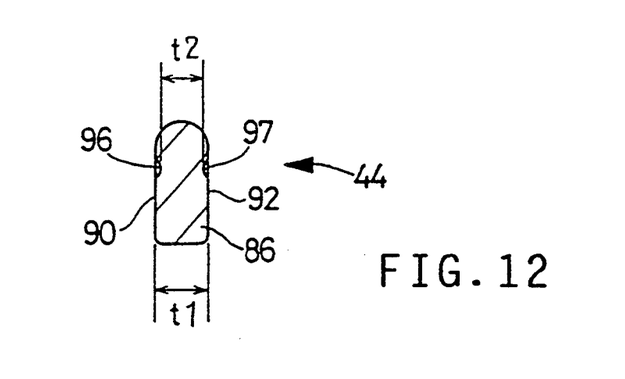
FIG. 12 is an elevational view of the second belt block taken along line 12—12 of FIG. 11.

Two preferred types of the belt block 44 are shown in FIGS. 9 and 10 as first belt block 44a, and in FIGS. 11 and 12 as second belt block 44b, respectively. The first belt block 44a is a generally elongate member having a constant height over its entire length parallel to the transverse direction of the chain belt 10. The first belt block 44a has one pair of tapered end faces 86 and 88 that frictionally engage with the opposed inner wall surfaces of the V-grooves of the variable-diameter pulleys 18 and 20. The tapered end faces 86, 88 correspond to the longitudinally opposite ends of the block 44a and define the length of the block 44a.

Engaging grooves 94 and 95 are formed in opposed front and back side surfaces 90 and 92 of each first belt block 44a, as shown in FIG. 10. The grooves 92, 93 are formed so as to extend in the longitudinal direction of the block 44a, which is transverse to the direction of extension of the chain belt 10, and has an arcuate cross sectional shape as shown in FIG. 10. The grooves 94, 95 are formed on one of opposite sides of the centerline C which is nearer to the tapered end face 86, as indicated in FIG. 9. The length of each engaging groove 94, 95 is larger than the total thickness of five link plates 36 by a predetermined distance. This distance is selected within a range that prevents the first and second chains 40, 42 from moving close to each other. The thickness t1 of the belt block 44a is slightly larger than the spacing W between the gripping protrusions 64 and 66 of the link plate 36. The thickness t2 between the bottoms of the engaging grooves 94 and 95 is slightly larger or smaller than the spacing W.

The second belt block 44b, which is shown in detail in FIGS. 11 and 12, differs from the first belt block 44a only in that engaging grooves 96 and 97 of the second belt block 44b are longer by a given amount than the total thickness of seven link plates 36. In the other aspects, the second belt block 44b is identical with the first belt block 44a. In FIGS. 11 and 12, the same reference numerals as used in FIGS. 9 and 10 are used to identify the corresponding elements.

When the chain belt 10 is assembled, the load blocks or belt blocks 44 are placed in parallel with each other at a preset interval along the length of the first and second chains 40, 42 such that each belt block 44 extends in the direction of width of the first and second chains 40, 42. The first and second belt blocks 44a, 44b are arranged alternately along the first and second chains 40, 42. For instance, the first belt block 44a shown in FIG. 1 are engaged with the stopper and link plates 34, 36 of the first chain 40, but are spaced apart from the second chain 42 with the gap Δh left between the outer edge or outer-side end face of the first belt block 44a and the surface regions 74, 75, 76, 77 of the plates 34, 36 as explained above. Further, the first belt block 44a shown in FIG. 1 is associated with the three link plates 36 of one of two adjacent sets of links 34, 36, while the second belt block 44b adjacent to the first belt block 44a is associated with the four link plates 36 of the other of the two adjacent sets of links 34, 36, as indicated in FIG. 3. Thus, the adjacent two first and second belt blocks 44a, 44b are associated with a total of seven link plates 36 of the first chain 40, as indicated in FIGS. 1 and 3. This arrangement is also true for the second chain 42.

Described more specifically, the tips of the gripping protrusions 64, 66 of the three link plates 36 of one (first set) of the two adjacent sets of links 34, 36 are press-fitted into the engaging grooves 94, 95 of the first belt block 44a, while the tips of the gripping protrusions 64, 66 of the four link plates 36 of the other (second set) of the two adjacent sets are press-fitted into the first engaging grooves 96, 97 of the second belt block 44b, as shown in FIG. 3. For press-fitting engagement of the protrusions 64, 66 of these seven link plates 36 into the engaging grooves 94, 95, 96, 97, the protrusions 64, 66 and the belt blocks 44a, 44b are elastically deformed when the link plates 36 and the belt blocks 44a, 44b are assembled together by moving the link plates 36 so that that the concave parts 68 are forced against the outer-side end faces of the belt blocks 44a, 44b. Then, the second arcuate pins 80 are inserted through the pin-fitting holes 60, 62 of the seven link plates 36.

Figure 7A:
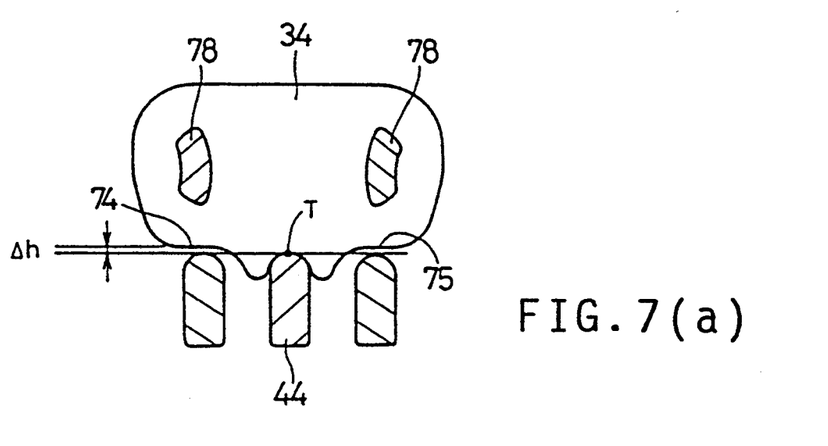
FIG. 7(a) is a side elevational view of the stopper plate of FIG. 5 and the belt blocks, indicating the gap $\Delta h$ between the stopper plate and the belt blocks.
Figure 7B:
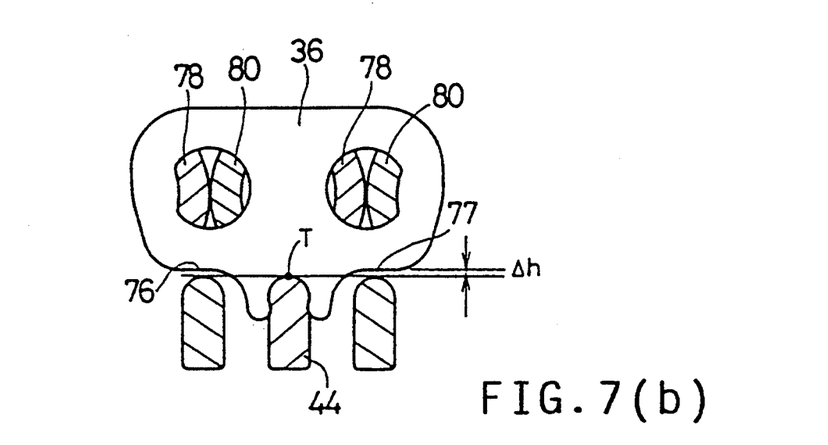
FIG. 7(b) is a side elevational view of the link plate of FIG. 6 and the belt blocks, indicating the gap $\Delta h$ between the link plate and the belt blocks.

Subsequently, the two stopper plates 34 are attached to the first belt block 44a such that the engaging concave parts 54 of the stopper plates 34 engage the outer-side end face of the block 44a and such that the stopper plates 34 sandwich the seven inner link plates 36 as indicated in FIG. 1. Then, the first arcuate pins 78 are inserted through the pin-fitting holes 60, 62 of the seven link plates 36 and through the pin-fitting holes 46, 48 of the two stopper plates 34, such that the first arcuate pins 78 contact the corresponding second arcuate pins 80, as indicated in FIG. 7(b). Thus, the first chain 40 is assembled. Similarly, the second chain 42 including the alternately arranged first and second belt blocks 44a, 44b can be assembled. The opposite end portions of the first arcuate pins 78 which project a short distance from the stopper plates 34 are caulked against the outer surfaces of the stopper plates 34. The first and second chains 40, 42 assembled as described above are positioned side by side relative to each other such that the two chains 40, 42 are offset from each other in the direction perpendicular to the belt blocks 44, by a distance equal to a half of the pitch of the chains 40, 42 (at which the sets of stopper and link plates 34, 36 are connected), and such that the first and second belt blocks 44a, 44b are alternately arranged. In the manner described above, the chain belt 10 including the first and second chains 40, 42 as shown in FIGS. 1, 3 and 4 is fabricated.

The outer-side end portion of the belt blocks 44a and 44b, which is on the radially outer side of the chain belt 10, is rounded so as to have an arcuate shape in cross section as shown in FIGS. 4, 10 and 12, which arcuate shape follows the arc of the engaging concave part 68 of the link plate 36. This configuration of the belt blocks 44a, 44b prevents an otherwise possible drawback that the belt block 44 which is engaged with the stopper and link plates 34, 36 of one of the first and second chains 40, 42 interferes with outer surface areas 98, 100, 102, 104 of the stopper and link plates 34, 36 of the other of the first and second chains 40, 42. The outer surface areas 98 and 100 partially define the engaging protrusions 50, 52 of the stopper plate 34 and are located remote from the engaging concave part 54, as shown in FIG. 5. The outer surface areas 102 and 104 partially define the gripping protrusions 64, 66 of the link plate 36 and are located remote from the engaging concave part 68, as shown in FIG. 6.

When the chain belt 10 is assembled, the load blocks 44 are placed in parallel at a preset interval along the chain belt 10 and so as to extend in a direction transverse to the first and second chains 40, 42. The blocks 44 are placed on the inner side of the first and second chains 40, 42 and are gripped by the gripping protrusions 64 and 66 of the first chain 40 and the second chain 42, alternately, to permit power transmission between the belt blocks 44 and the first and second chains 40, 42. The height of each belt block 44 is constant over the entire length of the belt block 44. Accordingly, the present chain belt 10 is effective to reduce local stress concentration of the belt blocks 44 during power transmission, as compared with the conventional chain belt of FIG. 13. Moreover, the endurance strength of the belt blocks 44 can be improved according to this structure.

In the present embodiment, the surface regions 76 and 77 of each link plate 36 shown in FIG. 7(b) of one of the first and second chains 40, 42 are spaced by the predetermined distance $\Delta h$ apart from the top or outer-side end face T of the belt blocks 44 held by the gripping protrusions 64, 66 of the link plates 36 of the other of the first and second chains 40, 42, in the direction from the inner side toward the outer side of the chains 40, 42, that is, in the direction opposite to the direction of extension of the protrusions 64, 66. This positional relationship between the surface regions 76, 77 of the link plates 36 and the belt blocks 44 prevents undesirable contact between the link plates 36 of one of the first and second chains 40, 42 and the belt blocks 44 held by the other chain 40, 42, which contact would take place due to movements of the first and second chains 40, 42 relative to each other in the radial direction of the V-pulleys 18, 20 during operation of the chain belt 10 on the V-pulleys 18, 20. Therefore, the present chain belt 10 does not require the belt blocks 44 to have the cut-out 208 as provided in the conventional chain belt 200 shown in FIG. 13, to prevent the above-indicated contact. This means that the belt blocks 44 can be formed with a constant height over their entire length parallel to the direction of width of the chains 40, 42. The elimination of the conventionally provided cut-out 208 results in an increase in the mechanical strength of the belt blocks 44.

Also, in this embodiment wherein the height of each belt block 44 is constant over its entire length, the shape of the belt block is simplified. Therefore, the belt block 44 can be easily manufactured. For example, the belt blocks 44 can be formed of a metallic material by: preparing a blank in the form of a bar by drawing using a die which has a hole whose cross sectional shape is identical with that of the belt block 44 taken along the centerline C indicated in FIG. 9, the drawing being effected with the metallic material forced against the die under pressure; cutting the prepared bar-like blank into pieces by using a press; and performing other operation on each of the obtained pieces (corresponding to the blocks 44), to form the engaging grooves 94, 95, 96, 97 by plastic deformation of the material of the obtained pieces. Therefore, the belt blocks 44 are easier and more economical to manufacture, than the belt block with constant height.

Also, in this embodiment, the belt blocks 44 are of two types, i.e., first belt blocks 44a and second belt blocks 44b. These belt blocks 44a, 44b differ in the length of the engaging grooves 94, 95 and 96, 97, so that the first and second belt blocks 44a, 44b are held by the different numbers of link plates 36 whose protrusions 64, 66 engage the grooves 94, 95, 96, 97. When the chain belt 10 is assembled, the belt blocks 44 can be automatically positioned with respect to the first chain 40 and second chain 42 in the rotational (circumferential) and transverse directions of the belt chain 10 by simply press-fitting the gripping protrusions 64, 66 of the link plates 36 into the engaging grooves 94 and 95 or 96 and 97 of the belt blocks 44.

Also, according to this embodiment, the belt blocks 44 have a constant height over their entire length. The belt blocks 44 are attached to the inner side of the first chain 40 and second chain 42. Therefore, contrary to the conventional chain of the prior art shown in FIG. 13 which extends through the through-hole 206, the chains 40, 42 are not limited in the number of the link plates 36 arranged in the transverse direction of the chain belt 10. In the conventional chain, the number of the link plates 36 is limited by the width of the through-hole 202. Therefore, the number of the link plates 36 disposed in the direction of the chains 40 and 42 can be increased for improved tensile strength of the chains 40 and 42.

Also, according to this embodiment, the outer edge or outer-side end portion of the belt block 44 is arc-shaped in cross section as seen in FIGS. 10 and 12. Therefore, enlargement of the widths of the engaging protrusions 50 and 52 of the stopper plate 34 and the gripping protrusions 64 and 66 of the link plate 36 does not cause interference between the belt block 44 (more precisely, the outer-side face of the belt block) and the engaging protrusions 50 and 52 and gripping protrusions 64 and 66 (more precisely, outer surface areas 98, 100, 102, 104). Accordingly, the widths of the engaging and gripping protrusions 50, 52, 64, 66 may be appropriately sized to ensure the required strength of the protrusions 50, 52, 64 and 66.

Also, according to the present embodiment, the chain belt 10 can be assembled by simply combining together the first chain 40 associated with an array of the belt blocks 44, and the second chain 42 associated with another array of the belt blocks 44. Thus, the assembling of the chain belt 10 is simplified.

While this invention has been described above in its presently preferred embodiment by reference to the accompanying drawings, it is to be understood that the present invention may be otherwise embodied.

In the above embodiment of this invention, the gripping protrusions 64 and 66 of the link plates 36 are press-fitted into the engaging grooves 94 and 95 or 96 and 97 of the belt blocks 44 by elastic deformation of the protrusions 64, 66 with the link plates 36 moved relative to the belt blocks 44 such that the engaging concave part 68 of each link plate 36 faces the outer-side end face of the belt block 44. However, the present invention is equally applicable to a type of chain belt wherein the tip of the gripping protrusions 64, 66 of the link plates 36 are fitted into the grooves which are open on one or both of the opposite end faces of each belt block, which define the length of the belt block. In this case, the link plates 36 are moved with the protrusions 64, 66 sliding in the grooves 94, 95, 96, 97 of the belt block 44 in the longitudinal direction of the belt block.

While the above embodiment is adapted to use two types of belt blocks 44, i.e., first belt block 44a and second belt block 44 whose engaging grooves 94, 95 and 96, 97 have different length dimensions, the chain belt according to the present invention may use the second belt blocks 44b only.

In the above embodiment, the outer-side edge of the belt block 44 has an arcuate cross sectional shape. However, the present invention may be practiced with the belt block 44 having such arcuate outer edge profile only in the half portion between the centerline C and the tapered end face 86, which half portion engages the concave parts 68 of the link plates 36. Of course, the present invention may be practiced with the belt block 44 having a substantially rectangular outer edge profile over the entire length.

While the rocker pin 38 in the above embodiment consists of the first arcuate pin 78 and the second arcuate pin 80, a single cylindrical pin may be used as the rocker pin.

It is to be understood that various other modifications or changes can be made in this invention, without departing the spirit and scope of the invention defined in the following claims.

What is claimed is:

1. A power transmission chain belt engageable with pulleys each having a V-groove, comprising:

a first chain and a second chain which are arranged in side-by-side parallel relationship with each other, each of said first and second chains including a plurality of sets of parallel links, and pivot members for connecting said sets of parallel links, said first and second chains being offset from each other in a longitudinal direction thereof by a distance equal to a half of a pitch of said sets of parallel links;

each of said plurality of sets of parallel links of said first and second chains including a plurality of link plates each of which has an inner-side end face on an inner side of said first and second chains, said each link plate having a pair of gripping protrusions formed so as to extend from an intermediate portion of said inner-side end face thereof, said inner-side end face including a concave part located between said pair of gripping protrusions;

a plurality of load block members each of which has an outer-side end face on an inner side of said first and second chains, said load block members being arranged in spaced-apart parallel relationship with each other and held alternately by said gripping protrusions of said link plates of said first and second chains, with said outer-side end faces of said load block members engaging said concave parts of said link plates, said each load block member having a substantially constant height over an entire length thereof and being oriented such that the length of said each load block member is parallel to a direction of width of said first and second chains; and said inner-side end face of said each link plate having surface regions which are spaced from said concave part in a direction opposite to a direction of extension of said gripping protrusions, whereby said surface regions of each of said link plates of one of said first and second chains which link plates are held by one of said load block members are spaced apart from said outer-side end face of the other load block members which are held by the link plates of the other of said first and second chains and which are located adjacent to said one load block member.

2. A power transmission chain belt according to claim 1, wherein said surface regions of said inner-side end face are located on opposite sides of said pair of gripping protrusions.

3. A power transmission chain belt according to claim 1, wherein said outer-side end face of said each load block member has an arcuate shape in cross section, and said concave part of said each link plate has a shape in cross section substantially identical with said arcuate shape of said outer-side end face of said each load block member.

4. A power transmission chain belt according to claim 1, wherein one of adjacent sets of said plurality of sets of parallel links further includes two stopper plates which are disposed so as to sandwich said plurality of link plates.

5. A power transmission chain belt according to claim 1, wherein said plurality of load block members consist of a plurality of first load block members and a plurality of second load block members, said first and second load block members which engage each of said first and second chains being arranged alternately in the longitudinal direction of said first and second chains.

6. A power transmission chain belt according to claim 5, wherein each of said first and second load block members has a pair of engaging grooves, said gripping protrusions of said link plates of one of said first and second chains engaging said engaging grooves of one of said first and second load block members which are adjacent to each other, while said gripping protrusions of said link plates of the other of said first and second chains engaging said engaging grooves of the other of said first and second load block members which are adjacent to each other.

7. A power transmission chain belt according to claim 5, wherein said engaging grooves of said first and second load block members have different length values.

8. A power transmission chain belt according to claim 1, wherein each of said link plates has a pair of pin-fitting apertures which are spaced apart from each other in a direction along a length thereof parallel to said longitudinal direction of the first and second chains, said pivot members extending through said pin-fitting apertures of the link plates of adjacent sets of said plurality of sets of parallel links, whereby said adjacent sets are connected to each other by said pivot members.

9. A power transmission chain belt according to claim 1, wherein each of said pivot members a first pin and a second pin which engage with each other.

10. A power transmission chain belt according to claim 9, wherein said first and second pins have facing arcuate contacting surfaces one of which rocks on the other.

11. A power transmission chain belt according to claim 1, wherein said first and second chains are offset from each other in said longitudinal direction by a distance substantially equal to a half of said pitch of said sets of parallel links.

* * * * *